(12) United States Patent
Ball et al.

(10) Patent No.: US 6,769,446 B1
(45) Date of Patent: Aug. 3, 2004

(54) FREEZE PROTECTION DEVICE FOR WALL HYDRANTS/FAUCETS

(75) Inventors: William T. Ball, Colorado Springs, CO (US); Cody W. Jackson, Colorado Springs, CO (US); Lawrence Almasy, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

(21) Appl. No.: 10/640,970

(22) Filed: Aug. 14, 2003

(51) Int. Cl.[7] ............ E03B 7/12; F16K 31/64; E03C 1/10
(52) U.S. Cl. ............ 137/59; 137/60; 137/301; 137/533.17; 137/538; 137/540; 137/614.16; 137/614.2; 137/614.21; 138/27; 138/30; 138/31; 138/32
(58) Field of Search .................. 137/59, 60, 61, 137/62, 218, 301, 302, 512.2, 533.11, 533.17, 538, 539, 540, 543.17, 599.18, 601.2, 614.2, 614.21, 107; 138/27, 30, 31, 32

(56) References Cited

U.S. PATENT DOCUMENTS

| | | | |
|---|---|---|---|
| 4,182,356 A | | 1/1980 | Woodford, Sr. ............ 137/59 |
| 5,392,805 A | * | 2/1995 | Chrysler .................... 137/360 |
| 5,740,831 A | * | 4/1998 | DeNardo et al. .......... 137/360 |
| 6,142,172 A | | 11/2000 | Shuler et al. ............... 137/59 |
| 6,532,986 B1 | * | 3/2003 | Dickey et al. ............. 137/360 |

* cited by examiner

Primary Examiner—George L. Walton

(57) ABSTRACT

A freezeless wall hydrant has a normally horizontal fluid inlet tube with an interior end and exterior end. A hollow valve fitting is rigidly secured to the interior end of the inlet tube for a connection to a source of pressurized fluid. A valve seat is located on an interior end of the valve fitting. An elongated hollow tube of a diameter less than the interior diameter of the inlet tube is positioned on the center line of the inlet tube and has inner and outer ends. A plug is rigidly secured to the inner end of the tube to close the inner end for fluid flow. A normally closed check valve is movably mounted in the tube to engage a valve seat on the plug, to open the tube for fluid therein under conditions of high fluid pressure in the inlet tube.

7 Claims, 6 Drawing Sheets

FREEZE PROTECTION DEVICE FOR WALL HYDRANTS/FAUCETS

BACKGROUND OF THE INVENTION

Freezeless wall hydrants and faucets have long been in existence. They characteristically have a fluid closure valve located in the end of an inlet pipe located within the wall or a warmer interior area of the building of which the wall is a part. This closure valve is operated by an elongated rod connected to an exterior handle. The freezeless characteristics of the hydrant are caused by the closure valve shutting off the flow of water within the wall or building at a freezing temperature, with the residual water in the inlet pipe flowing by gravity outwardly through the conventional outlet drain of the hydrant.

The foregoing structure works very successfully except in situations where a hose or the like is attached to the outlet drain of the hydrant, whereupon the residual water is not able to easily flow by gravity out of the hydrant when the closure valve connected to the pressurized water is closed. With a hose attached during freezing weather, the residual water freezes within the hydrant, and the inlet pipe or related components thereupon rupture from the freezing conditions within the hydrant.

It has in recent times been recognized that the rupture of such a hydrant under freezing weather conditions does not take place because of the frozen water in the hydrant. Rather, the rupture results from the ice imposing severe pressure on the captivated non-frozen fluid in the inlet pipe. Thus, the increased pressure on this water by the expanded ice is the principal cause for the rupture of the hydrant.

Accordingly, it is a principal object of this invention to provide a freezeless wall hydrant which has the ability to relieve the pressure on the residual water located inwardly of frozen residual water located outwardly thereof when that water freezes by reason of a hose or the like being attached to the discharge nozzle.

A further object of the invention is to provide a freezeless wall hydrant which has the ability to relieve the pressure on residual water located inwardly of frozen residual water located outwardly thereof by means of an auxiliary passageway guarded by a check valve within the hydrant which will allow for the escape of residual water under pressure caused by icing conditions.

These and other objects will be apparent to those skilled in the art.

SUMMARY OF THE INVENTION

A freezeless wall hydrant has a normally horizontal fluid inlet tube with an interior end and exterior end. A hollow valve fitting is rigidly secured to the interior end of the inlet tube for a connection to a source of pressurized fluid. A valve seat is located on an interior end of the valve fitting.

A head member is rigidly secured to the outer end of the inlet tube and includes a drain conduit in communication with an interior of the inlet tube for discharging water from the hydrant. A valve body is longitudinally movably mounted in the inlet tube adjacent to the valve fitting. A valve seating element is on the valve body and is adapted to engage and disengage the valve seat to prevent or to permit, respectively, a fluid flow through the valve fitting into the inlet tube.

An elongated hollow tube of a diameter less than the interior diameter of the inlet tube is positioned on the center line of the inlet tube and has inner and outer ends. A plug is rigidly secured to the inner end of the tube to close the inner end for fluid flow. The plug is connected to the valve body to rotate the valve body when the tube is rotated. A handle is connected to the outer end of the tube for rotating the same.

A valve seat surface is formed on the outer end of the plug and a fluid channel is associated with the plug to permit fluid to flow from the interior of the inlet tube to the valve seat surface. A check valve in the form of a piston or a ball is slidably or movable mounted in the tube and is adapted to engage the valve seat surface to normally prevent fluid flow through the plus into the tube. The plug is adapted to permit fluid flow into the tube when out of engagement with the valve seat surface.

A compression spring is in the tube and engages the check valve to normally hold the check valve in engagement with the valve seat surface.

An air conduit is associated with the tube for venting air from the interior of the tube to the atmosphere surrounding the tube when there is pressurized fluid pushing the check valve away from the valve seat surface.

DESCRIPTION OF THE EMBODIMENTS OF THE INVENTION

Figure 1:
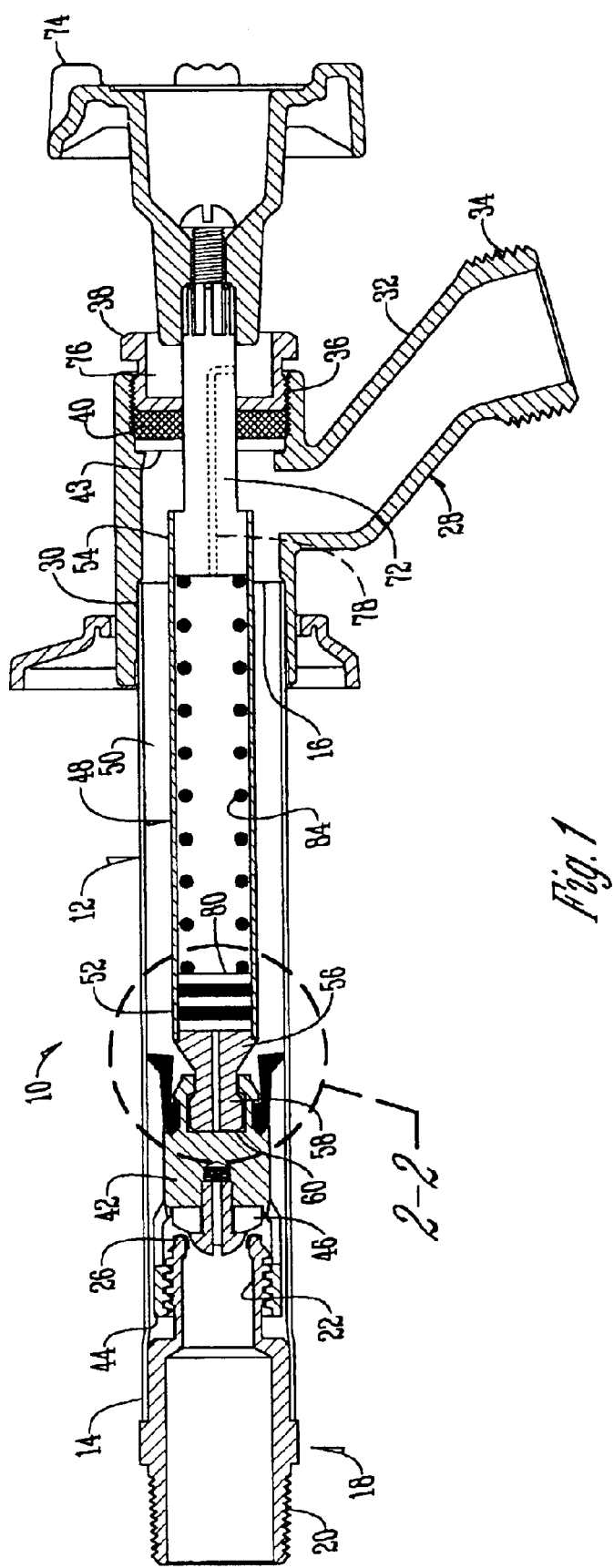
FIG. 1 is a longitudinal sectional view of the first embodiment of the invention.

The hydrant 10 in FIG. 1 has an elongated hollow water inlet tube 12 which has an interior end 14 and an exterior end 16. A hollow valve fitting 18 is rearwardly secured to the interior end 14 of tube 12 and has an inlet end 20 adapted to be secured to a conduit connected to a source of pressurized fluid (not shown). The fitting 18 has an interior end 22 with external threads 24, and which terminates in a valve seat 26.

A head member 28 with hollow interior end 30 is rigidly connected to the exterior end 16 of inlet tube 12. A conventional fluid drain conduit 32 is located within casting member 28 and is in communication with the interior of tube 12. Conventional threads 34 are located on the discharge end of conduit 32 to receive a conventional hose or the like. Casting member 28 also has a threaded aperture 36 which is adapted to receive a conventional bushing 38 which in turn receives packing 40 which is held in tight engagement with bushing 38 by packing washer 43 (FIG. 1).

With reference to FIG. 1, a valve body 42 has an internally threaded bore at its inner end 44 which threadably engages the threaded end 22 of hollow valve fitting 18. An elongated hollow tube 48 is mounted within inlet tube 12 along the center line thereof, and has inner end 52 and outer end 54. A plug 56 is rigidly mounted within the inner end 52 of tube 48 and has head 58 rigidly located within socket 60 of valve body 42. This connection is effected by conventional splines (not shown) in the socket 60 on head 58 which are intermeshed so that the valve body 42 will rotate whenever the plug 56 is rotated.

Figure 2:
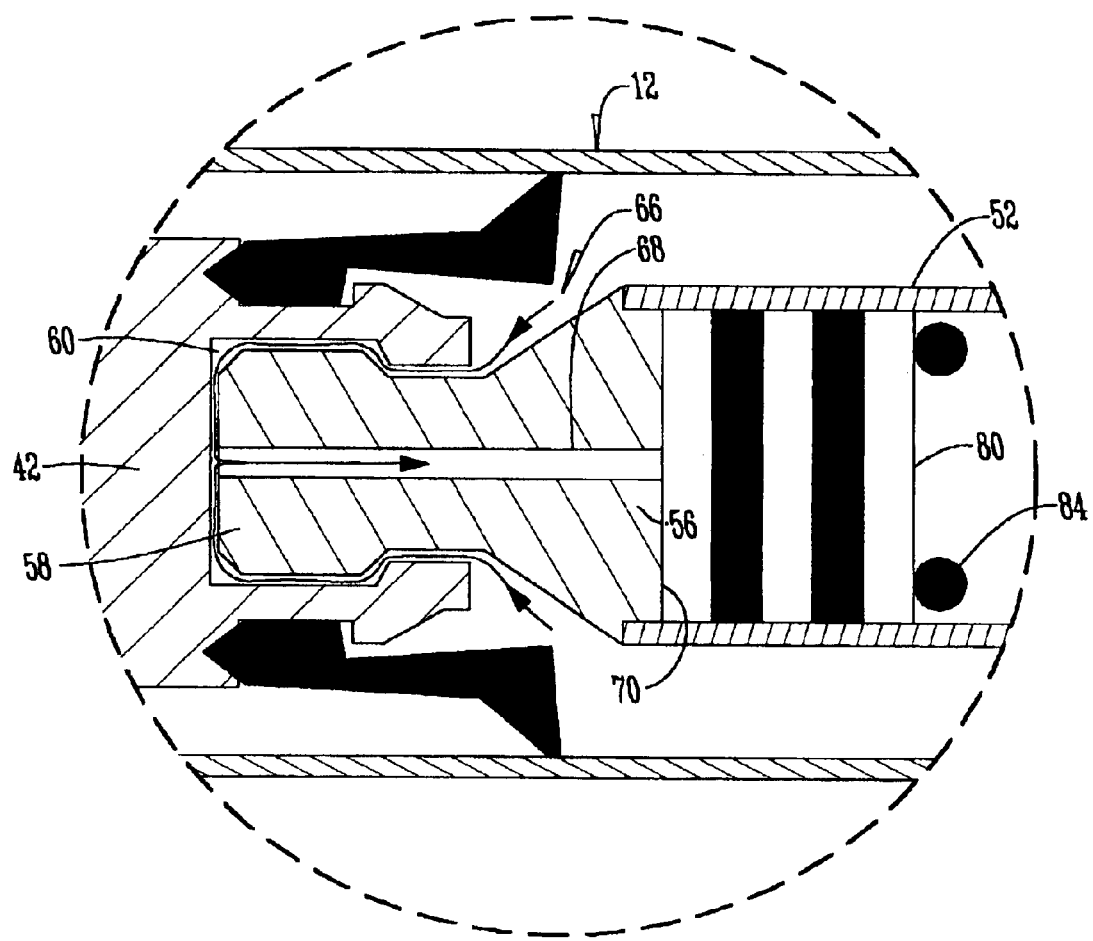
FIG. 2 is an enlarged scale sectional view taken on line 2—2 of FIG. 1.
Figure 3:
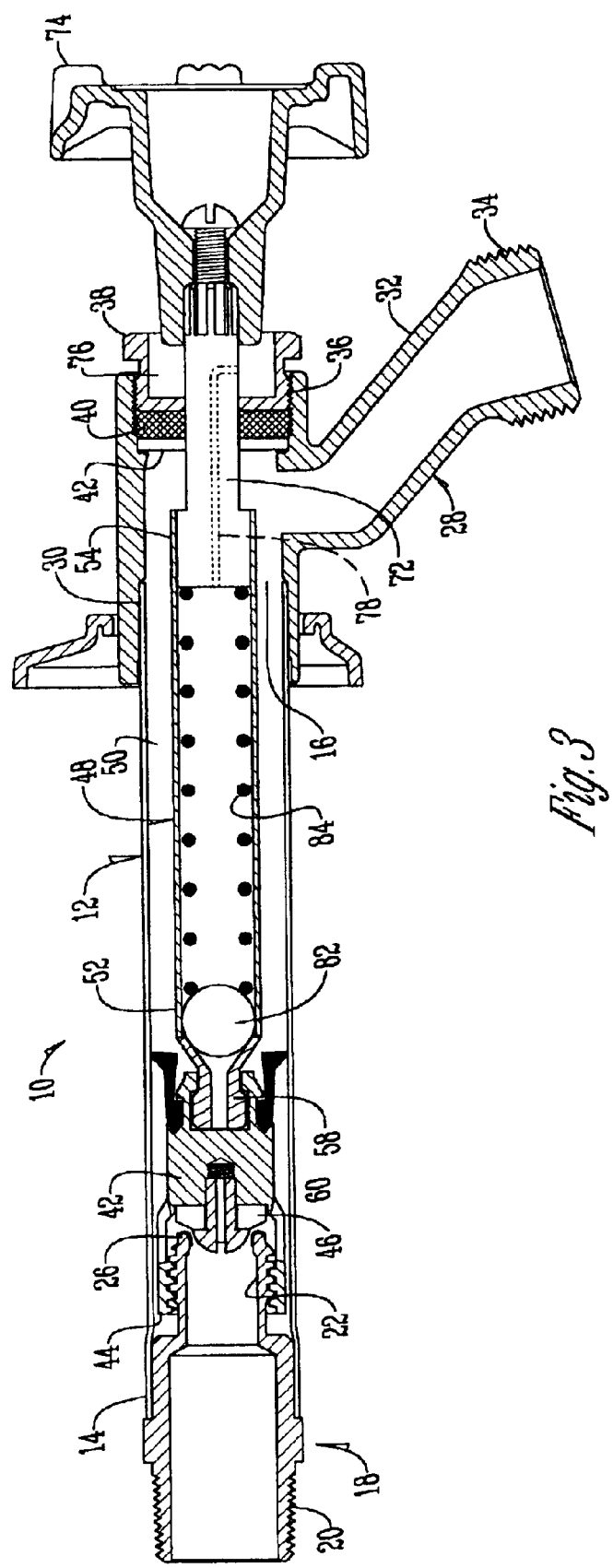
FIG. 3 is a view similar to that of FIG. 1 showing a modified form of the invention.
Figure 4:
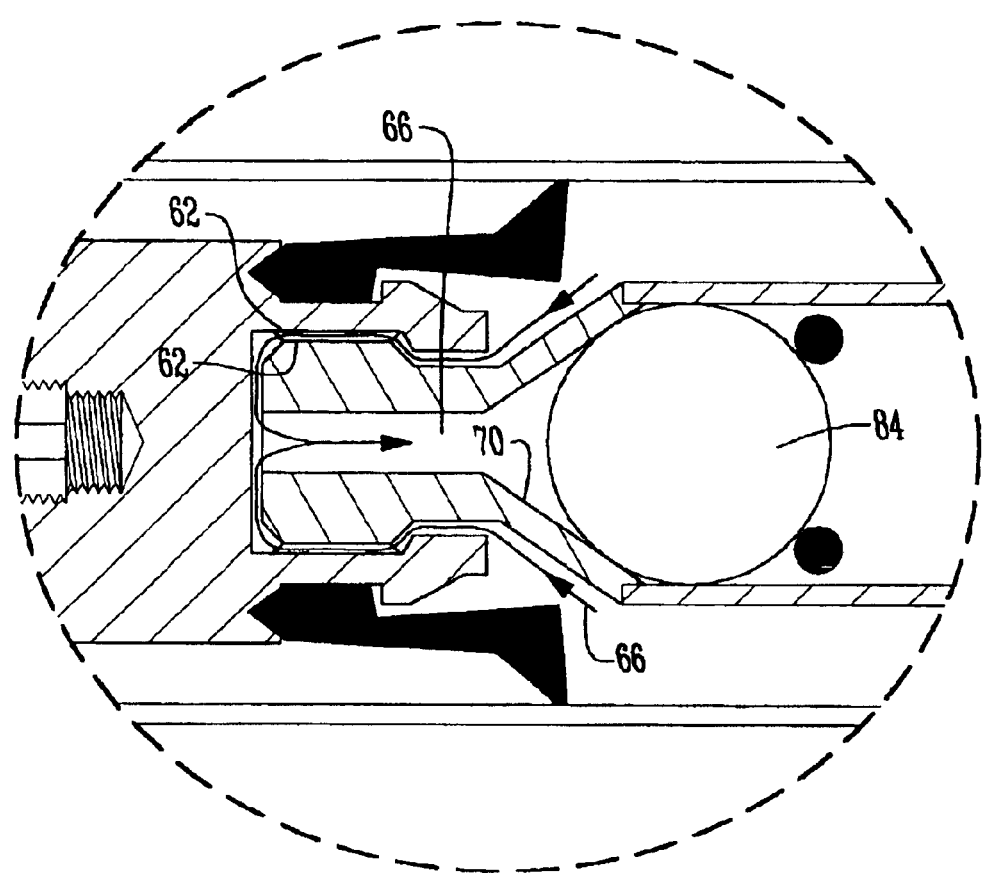
FIG. 4 is an enlarged scale sectional view taken on line 4—4 of FIG. 3.
Figure 5:
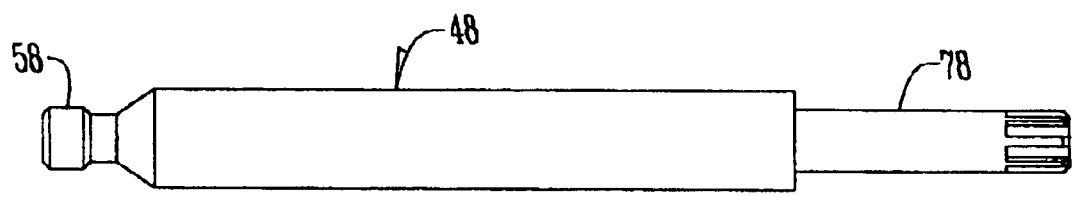
FIG. 5 is a side elevational view of an elongated hollow tube used in the device of this invention.

A fluid channel 66 exists between the adjacent surfaces of the plug 56 and socket 60 so as to permit fluid within the interior of inlet tube 12 to migrate around the head 58 of plug 56 to enter axial bore 68 in the plug. (FIGS. 2 and 4). A vertical valve seat surface 70 appears on the outer end of plug 56 (FIGS. 1 and 2), and a tapered valve seat surface 70 is formed on the outer end of the plug 56 in the alternate embodiment shown in FIGS. 3 and 4.

A connector shaft 72 is connected to the outer end of tube 48 to close the outer end of the shaft. Shaft 72 extends outwardly from tube 48 and has an operating handle wheel 74 on the outer end thereof to permit the hydrant 10 to be opened or closed for fluid flow. A space 76 extends around the outer end of shaft 72 and is exposed to the atmosphere. An air vent passageway 78 has an outer end in communication with space 76 and then extends longitudinally inwardly to be in communication with the interior of tube 48.

In FIGS. 1 and 2, a piston 80 is slidably mounted in the inner end of tube 48 and is adapted to close against the valve seat surface 70 to close the axial bore 68 against fluid flow. Similarly, a ball 82 is located in a similar position as piston 80 in the structure of FIGS. 3 and 4 whereupon the ball 82 engages the tapered valve seat surface 70 to close fluid flow through the axial bore 68 in plug 70. In each case, a compression spring 84 within the interior of tube 48 exerts pressure against the piston 80 or the ball 82 to maintain the sealing condition against the valve seat surfaces 70. With reference to FIG. 7, under freezing conditions when a hose or the like is secured to the fluid drain conduit 32, ice can be formed in the outer portion of space 50 between the interior diameter of tube 48 and the outer surface of tube 48. Residual water 88 is typically located inwardly from ice 86 as also shown in FIGS. 6 and 7.

Figure 6:
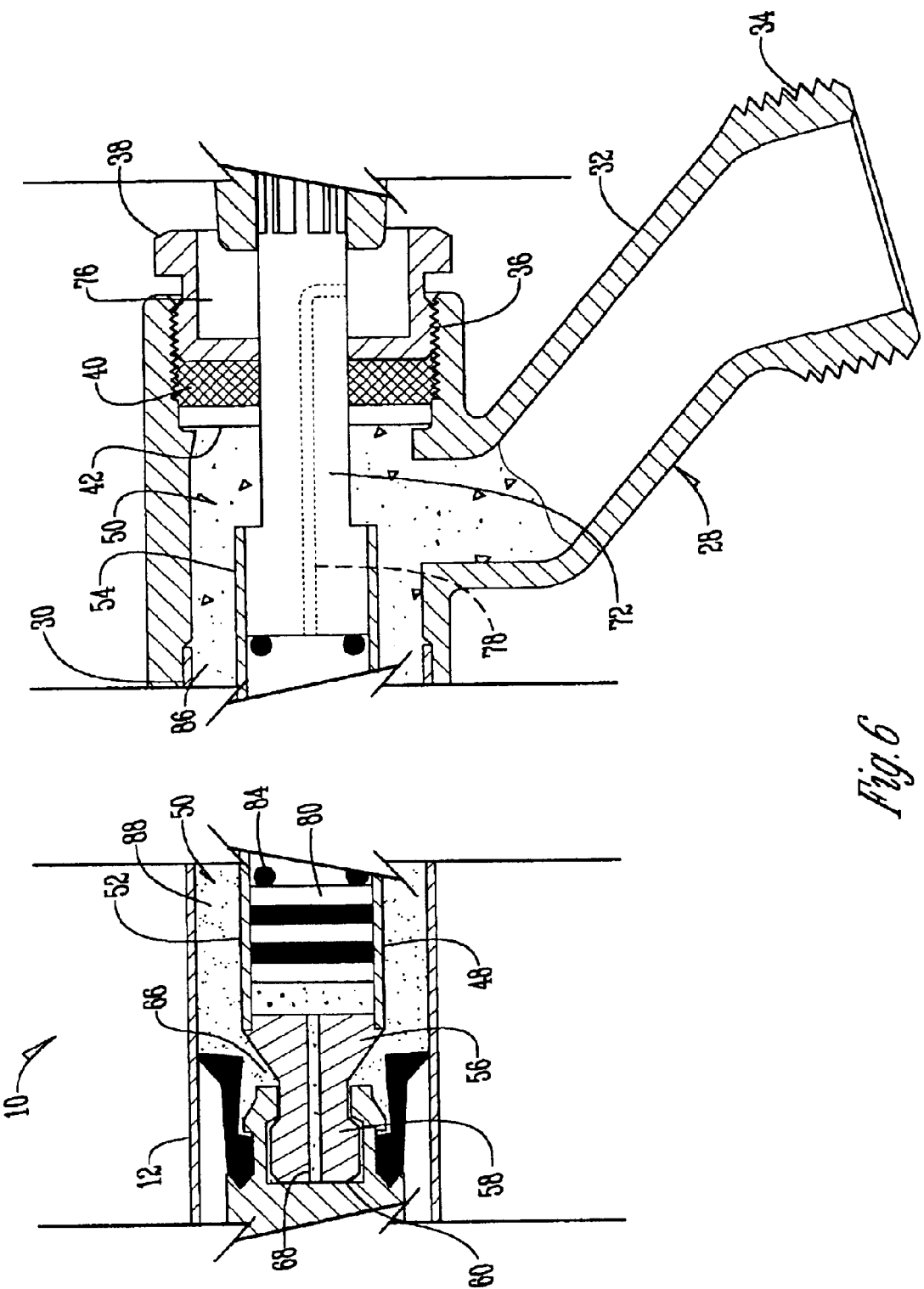
FIG. 6 is an enlarged scale partial sectional view of FIG. 1 under freezing conditions.
Figure 7:
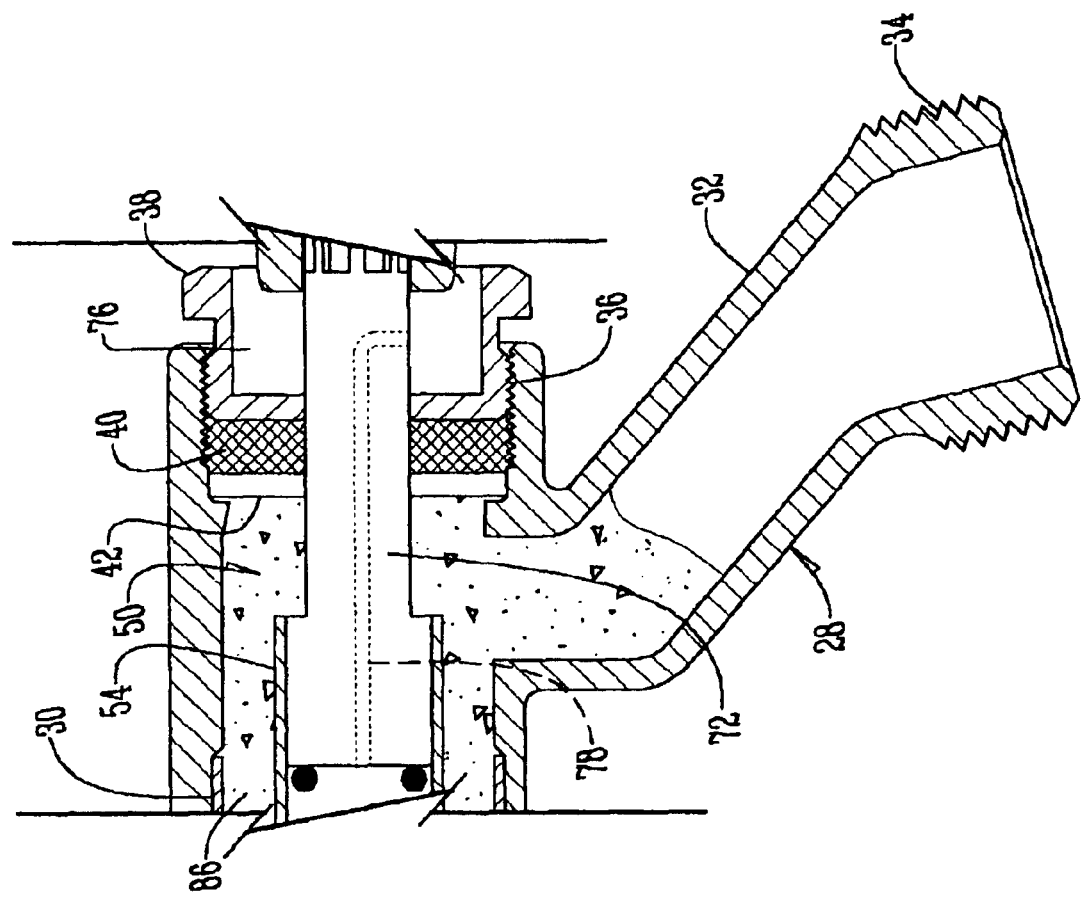
FIG. 7 is an enlarged scale partial sectional view of FIG. 3 under freezing conditions.
Figure 7:
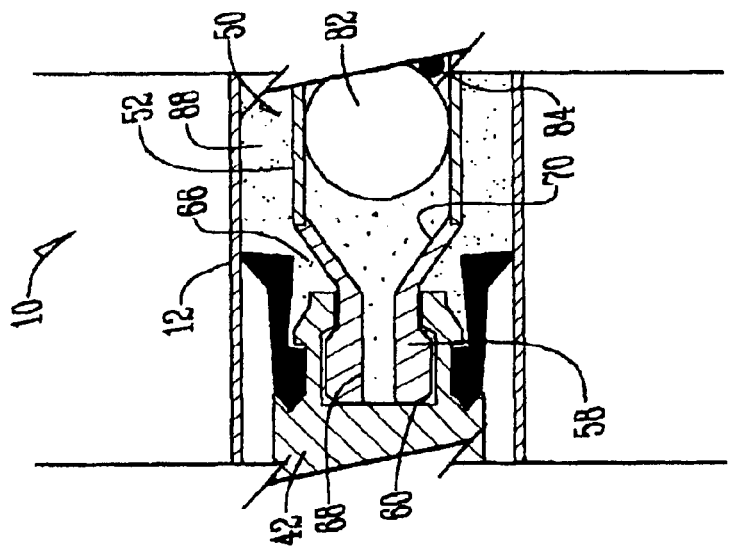

With reference to FIGS. 6 and 7, when a hose or the like is left on the fluid drain 32 which prevents residual water within the hydrant from draining therefrom by gravity, freezing temperatures will cause ice 86 to accumulate in the casting member 28 and around the outer end of the tube 48 within the inlet tube 12. The presence of the ice 86 ordinarily would create substantial pressure on the residual water 88 dwelling around the inner end of tube 48 within the space 50. With reference to both FIGS. 6 and 7, high pressures exerted upon the residual water 88 will exert substantial pressure on either piston 80 (FIG. 6) or the ball 82 (FIG. 7). The water pressure on these components will be exerted by the fluid in the fluid channel 66 surrounding plug 56 and the fluid in the axial bore 68 extending through the plug 56. This pressure being exerted on the check valve elements (piston 80 or ball 82) will cause the elements 80 or 82 to move towards the outer end of tube 48 away from the valve seat surfaces 70. Spring 84 is compressed as this takes place as shown in FIGS. 6 and 7. The air vent passageway 78 in connector shaft 72 will permit air within the outer end of tube 48 to exit the tube to the atmosphere through space 76. When these events take place, the highly pressurized residual water within the space 50 will move into the inner end of the tube, thus reducing the pressure on such fluid.

When the freezing conditions of FIGS. 6 and 7 take place, the pressure on the residual water 88 in excess of 1400 psi would cause the tube 12 to rupture. Because of the presence of the check valves 80 and 82 (piston 80 and ball 82) the pressure exerted on the water 88 by the ice 86 is reduced substantially below the rupture pressure which would normally exist.

Typically, the removal of a teaspoon of residual water from the inner end of intake tube 12 into tube 48 (FIGS. 6 and 7) will be sufficient to keep the rupturing pressure of the residual water from being reached.

Thus, from the foregoing, it is seen that this invention will achieve all of its objectives.

We claim:

1. A freezeless wall hydrant, comprising,
   a normally horizontal fluid inlet tube having an interior end and an exterior end,
   a hollow valve fitting rigidly secured to the interior end of the inlet tube for connection to a source of pressurized fluid,
   a head member secured to the outer end of the inlet tube and including a drain conduit in communication with an interior of the inlet tube for discharging water from the hydrant,
   an elongated hollow tube of a diameter less than an interior diameter of the inlet tube positioned within the inlet tube and having inner and outer ends,
   a plug rigidly secured in the inner end of the hollow tube and closing the inner end of the hollow tube for fluid flow,
   the plug being connected to the valve body to rotate the valve body when the hollow tube is rotated,
   means on the outer end of the hollow tube for rotating the same,
   a valve seat surface on an outer end of the plug,
   a fluid channel associated with the plug to permit fluid to flow from the interior of the inlet tube to the valve seat surface,
   a piston slidably mounted in the hollow tube, and adapted to engage the valve seat surface to normally prevent fluid flow through the plug into the hollow tube, and adapted to permit fluid flow into the hollow tube when out of engagement with the valve seat surface, and
   a resilient element in the hollow tube engaging the piston to normally hold the piston in engagement with the valve seat surface.

2. The hydrant of claim 1 wherein an air conduit is associated with the hollow tube for venting air from the interior of the hollow tube to the atmosphere surround the tube when there is pressurized fluid pushing the piston away from the valve seat surface.

3. The hydrant of claim 1 wherein the hollow tube is positioned on a center axis of the inlet tube.

4. A freezeless wall hydrant, comprising,
   a normally horizontal fluid inlet tube having an interior end and an exterior end,
   a hollow valve fitting rigidly secured to the interior end of the inlet tube for connection to a source of pressurized fluid,
   a head member rigidly secured to the outer end of the inlet tube and including a drain conduit in communication with an interior of the inlet tube for discharging water from the hydrant,
   an elongated hollow tube of a diameter less than an interior diameter of the inlet tube positioned on a center line of the inlet tube and having inner and outer ends,
   a plug rigidly secured in the inner end of the hollow tube and closing the inner end of the hollow tube for fluid flow, the plug being connected to the valve body to rotate the valve body when the hollow tube is rotated, means on the outer end of the hollow tube for rotating the same, a valve seat surface on an outer end of the plug, a fluid channel associated with the plug to permit fluid to flow from the interior of the inlet tube to the valve seat surface, a ball slidably mounted in the hollow tube, and adapted to engage the valve seat surface to normally prevent fluid flow through the plug into the hollow tube, and adapted to permit fluid flow into the hollow tube when out of engagement with the valve seat surface, and a resilient spring in the hollow tube engaging the ball to normally hold the ball in engagement with the valve seat surface.

5. The hydrant of claim 4 wherein an air conduit is associated with the hollow tube for venting air from the interior of the hollow tube to the atmosphere surrounding the hollow tube when there is pressurized fluid pushing the ball away from the valve seat surface.

6. A freezeless wall hydrant, comprising, a normally horizontal fluid inlet tube having an interior end and an exterior end, a hollow valve fitting rigidly secured to the interior end of the inlet tube for connection to a source of pressurized fluid, a head member rigidly secured to the outer end of the inlet tube and including a drain conduit in communication with an interior of the inlet tube for discharging water from the hydrant, an elongated hollow tube of a diameter less than an interior diameter of the inlet tube positioned on a center line of the inlet tube and having inner and outer ends, a plug rigidly secured in the inner end of the hollow tube and closing the inner end for fluid flow, the plug being connected to the valve body to rotate the valve body when the hollow tube is rotated, means on the outer end of the hollow tube for rotating the same, a valve seat surface on an outer end of the plug, a fluid channel associated with the plug to permit fluid to flow from the interior of the inlet tube to the valve seat surface, a valve element slidably mounted in the hollow tube, and adapted to engage the valve seat surface to normally prevent fluid flow through the plug into the hollow tube, and adapted to permit fluid flow into the hollow tube when out of engagement with the valve seat surface, and a resilient element in the hollow tube engaging the valve element to normally hold the valve element in engagement with the valve seat surface.

7. The hydrant of claim 6 wherein an air conduit is associated with the hollow tube for venting air from the interior of the hollow tube to the atmosphere surround the hollow tube when there is pressurized fluid pushing the valve element away from the valve seat surface.

* * * * *